Dec. 6, 1966   S. R. GILFORD ETAL   3,289,527
FLOW-THROUGH CELL INCLUDING MEANS FOR PROVIDING
A UNIFORM FLOW PATTERN THERETHROUGH
Filed Aug. 2, 1963   2 Sheets-Sheet 2
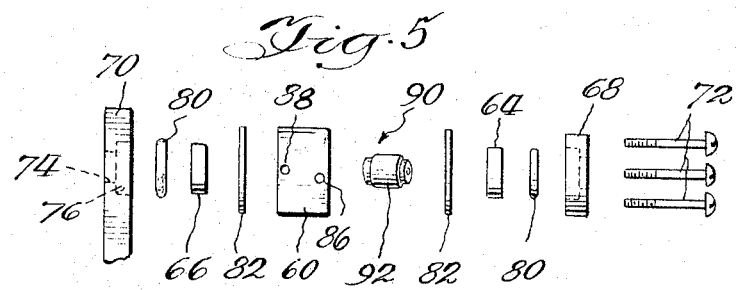
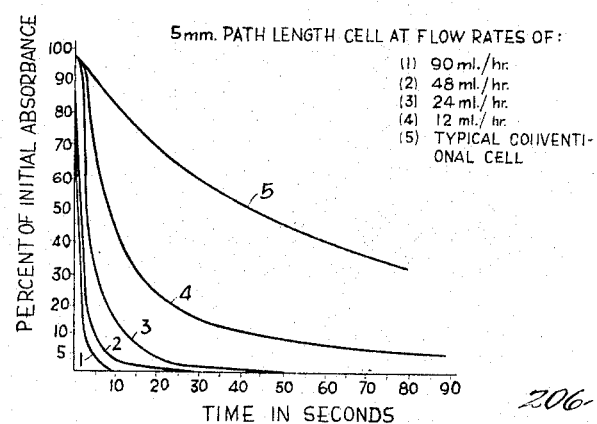
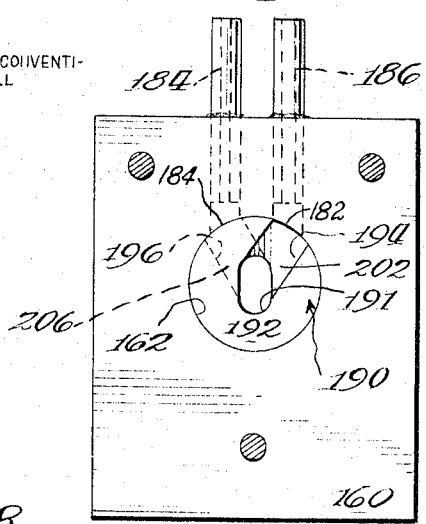
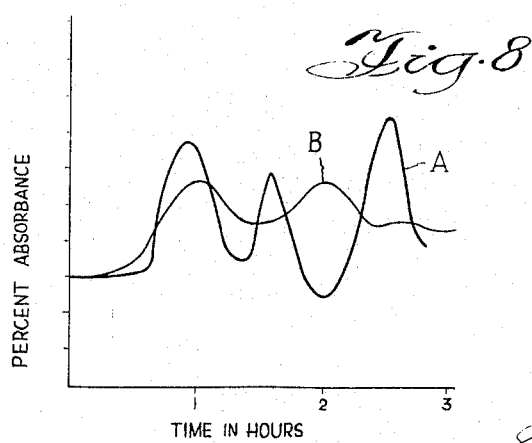
Inventors
Saul R. Gilford
Robert J. Emary
By Silverman, Mullin, Cass & Kaufman
Attorneys

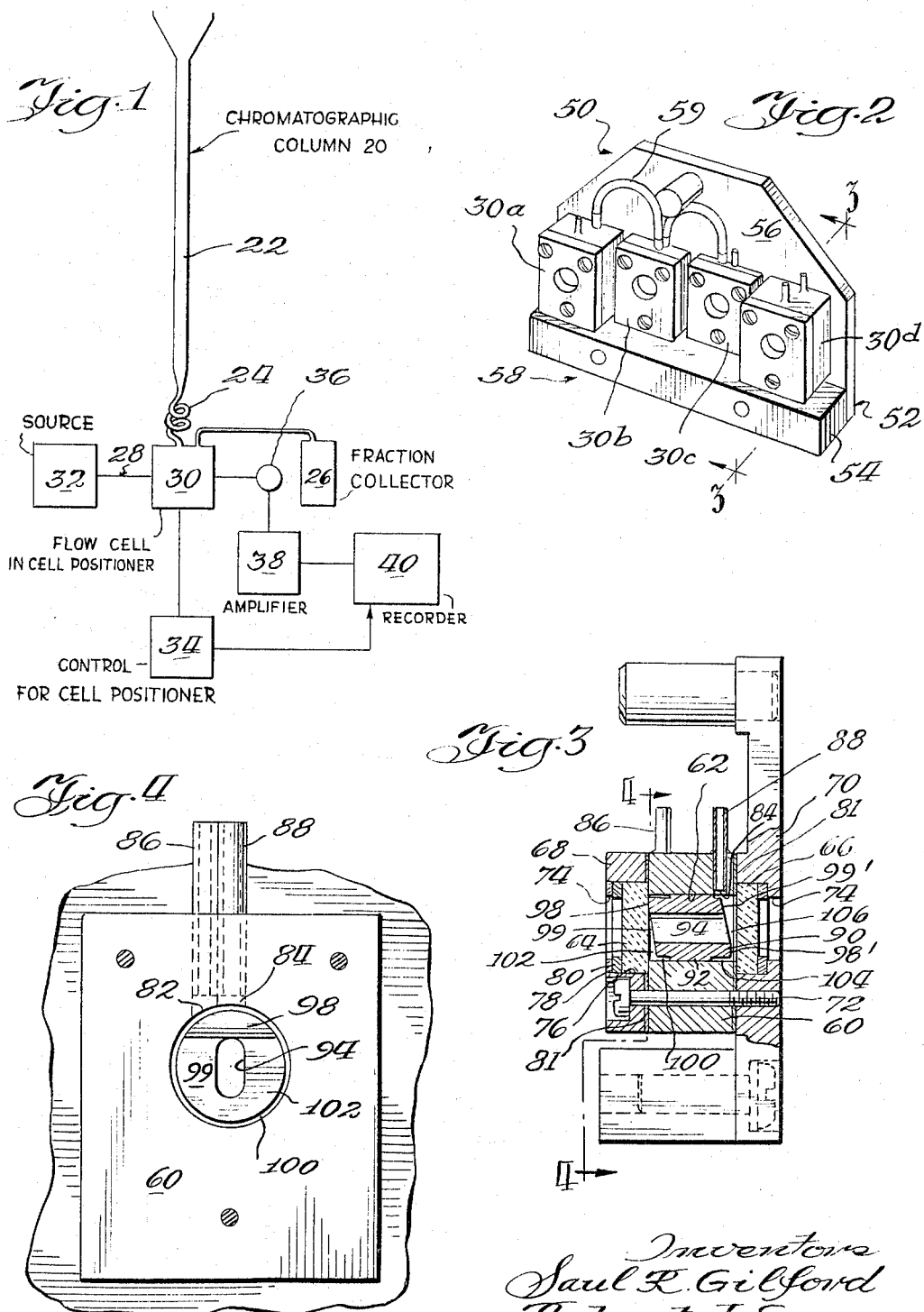

United States Patent Office 3,289,527
Patented Dec. 6, 1966

3,289,527
FLOW-THROUGH CELL INCLUDING MEANS FOR PROVIDING A UNIFORM FLOW PATTERN THERETHROUGH
Saul R. Gilford and Robert J. Emary, Oberlin, Ohio, assignors to Gilford Instrument Laboratories, Inc., Oberlin, Ohio, a corporation of Ohio
Filed Aug. 2, 1963, Ser. No. 299,549
5 Claims. (Cl. 88—14)

This invention relates generally to apparatus for use in the photometric determination and study of physical properties of substances and more particularly, concerns the provision of a novel examining cell structure for use thereof in the optical monitoring of continuously flowing fluid samples such as, effluent fluid bodies discharged as fractions from one or more chromatographic columns.

As is well known, it is possible to analyze substances by means of passing light through solutions, suspensions and dispersions thereof by measuring the absorbancy of light passing therethrough and relating such absorbancy measurements to optical density. In instances where substances or combinations thereof have a characteristic affinity to, or absorbancy, of certain wave-lengths of light, such absorbancy measurements may not only relate to concentration, but also to the chemical identity of the substance.

Also, many substances, when placed in solution, tend to be absorbed in a given solid or absorbing medium at rates generally characteristic of the chemical structure thereof. When a solution, containing a mixture of different components, is poured down a long column which has been packed with a given absorbing medium, each component is taken up by the absorbing medium at differing rates. Each rate is characteristic of a particular chemical component. Hence, the components are separated as the mixture passes through the column. The solvent may be continuously fed through the column, subsequent to the sample and, since each component will travel through the column at a different rate due to differences in absorbancies, the effluents discharged from the bottom end of the long column will consist of distinct successively discharged fractions, each containing a component of the mixture as its major constituent. Each component also has a concentration, in its respective fraction, related to the original concentration thereof in the sample mixture. Analytical methods utilizing the last mentioned phenomena are generally referred to as "chromatographic analysis" and offer great accuracy for study and analysis of complex compositions. Such accuracy is greater than is possible using other separatory procedures; for example, fractional distillation. Chromatographic methods are especially advantageous in cases where the physical property upon which separation is based may vary only slightly, or where azeotropic mixtures are encountered, as in many fractional distillation procedures. It is highly desirable to utilize the separatory advantages of the chromatographic procedures in conjunction with identification and analysis by absorbancy measurements for studying the properties of substances. This may be accomplished by monitoring the effluent fractions from the chromatographic column as the same continuously discharged therefrom.

The usual method of measuring absorbancy of light contemplates placing the solution being measured in a small cell or chamber, cell having a pair of opposite walls transparent to the particular wave length of light selected. This cell is interposed between a source of said wave length of light and a photosensitive detecting element, the output of which is amplified and recorded. In the measurement of static or non-flowing systems, the sample cell must merely offer a precisely known volume and light-path. For static systems, the effect of flow characteristics of fluids in the cell is not critical since the sample is substantially at rest.

In adapting heretofore known cells for use with continuously flowing fluids, the fluid flow characteristics within the cell become of critical importance. First, since the purpose in using a chromatographic column is to obtain distinct separation, fractions being discharged from the column must be maintained as separated fractions. A fraction passing through the monitoring or examining chamber must be substantially entirely displaced from the chamber by the next succeeding fraction. In flow cells adapted from the said "static" cells, the chamber is generally defined by an open-ended lateral bore provided in the body of the cell, said bore being closed at both ends by windows transparent to selected wave length of light. The body of the cell is provided with inlet means to the upper portion of the chamber at one end thereof and outlet means at its opposite end. The beam of light is directed through the axial center of the windows and the chamber. As the fluid fraction enters the chamber, the flow rate of the fluid normally is greater at the center of the moving stream than at the periphery of the stream normally adjacent the wall of the chamber. A residual portion of the fraction thus lags behind the main body of moving fluid. Residual portions of a fraction remaining within the chamber thus will contaminate the next succeeding fraction and defeat the separation accomplished by the chromatographic column. The inability to eliminate a residual history of a prior fraction has been a substantial deterrent to accurate anlysis using the aforesaid, highly desirable method.

Another pertinent effect of fluid movement normally encountered in the above described apparatus relates to the velocity of the fluid being greatest immediately at the mouth of the inlet port; the fluid tending to flow or stream in an arcuate flow path. By such streaming, the fluid leaves a slower velocity pocket at the upper median portion of the chamber intermediate the ports, and additional somewhat static pockets closely adjacent one or both of the opposed windows. It is believed that the presence of sharp corners within the chamber at the windows may contribute to formation of such latter pockets. The resulting unevenness of flow affects the density and/or the concentration of the solution at different locations within the chamber, and the variable absorbancies of light due to the presence of such streams of fluid will deleteriously affect the reliability of the measurements obtained. The measurements obtained may not properly reflect the true absorbancy characteristics from which concentration and/or identity of the components of any selected fraction may be determined.

Where the rate of flow is rapid, variations and error caused by steaming and inadequate displacement are minimized. However, avoidance of variations in velocity within the chamber becomes critical where the duration of flow of fluid through the chromatographic column is lengthy and/or at a relatively slow rate. One also encounters a tendency for turbulence and/or bubbles not only to be formed, but to collect at areas offering low flow rate within the chamber, such as in the pockets adjacent the windows. Occasionally these areas lie within the light path and here again, the light beam would be improperly dispersed to result in inaccuracies and fallacious readings.

Accordingly, it is the principal object of the invention to provide a flow-through cell structure which substantially eliminates the disadvantages heretofore encountered, and is particularly adapted for monitoring of continuously flowing fluids.

Another object of the invention is to provide a flow-through cell of the character described which includes a cell block defining a sample holding chamber and having inlet and outlet ports communicating therewith, light transmitting means sealably engaged at the respective opposite ends of said chamber, and means intermediate said inlet and outlet ports and said chamber for selectively increasing the flow velocity of fluids passing therethrough at the peripheral areas thereof whereby to form a substantially uniform flow pattern wherein the chamber and thereby to displace any residual portion of a prior fraction within the chamber in a minimal time duration.

A further object of the invention contemplates providing, in a flow-through cell particularly adapted for use in monitoring chromatographic column effluents in continuous flow, a cell block of rectangular configuration having a lateral bore formed therein and having inlet and outlet passageways disposed respectively adjacent opposite ends of said bore, the ends of the bore being closed off by a pair of light transparent windows in sealable engagement with the block and, as means defining diffusion means, an insert member of cylindrical configuration having an examining chamber therein, a portion of said insert member being of a diameter chosen to enable telescopic forced fit of said insert member wherein the bore, one end thereof flush with the mouth of the bore at one end of the bore, said insert member being characterized by having a pair of oppositely directed milled portions at opposite ends thereof, said milled portions and the inner surface of the window defining diffuser chambers for imparting to fluids entering the examining chamber, a differential flow velocity to increase the velocity of flow at those portions of the fluid adjacent the walls of the chamber thereby achieving a uniform flow patern neutralizing the normal flow retarding effect of the said walls to the peripheral areas of the flowing fluid body.

It is a further, important object of the invention to provide a flow cell structure of the character described in which the examining chamber is of eliptical cross-sectional configuraion, which enables a cell of minimum cell volume to be constructed with no loss of or restriction upon the light flux available to the photocell of the scanning system. It must be pointed out that prior solutions to problems of reducing cell volume were directed to use of small diameter passageways of circular cross-section. These passageways were formed to restrict the amount of light capable of being passed therethrough and hence a minimum light flux was available to the photocell with attendant strain upon the photometric scanning system. The invention permits small cell volume to be achieved while also increasing the light flux available to the said photocell.

Another object of the invention is to provide a flow cell structure provided with novel diffuser means therein, including means forming an inlet annulus, for obtaining a diffused flow pattern of fluid fractions, thereby preventing accumulation of turbulence and/or bubbles within the examining light path.

Other objects and advantages of the invention include in addition to providing a flow-through cell structure for use in the analysis of continuously flowing fluids by optical means, one which is readily dismountable and disassembleable for easy cleaning and replacement; which is economical to manufacture; which is capable of use in assemblies thereof, and which is capable of being economically constructed with precision and accuracy, and in a number of individually different light beam path lengths.

With the foregoing and other object in view which will appear as the description proceeds, the invention consists of certain novel features of construction, arrangement and combination of parts hereinafter fully described, illustrated in the accompanying drawing, and particularly pointed out in the appended claims. It should be understood that various changes in the form, proportion, size and minor details of the structure may be made without departing from the spirit or sacrificing any of the advantages of the invention.

Referring to the drawing, in which the same characters of reference are employed to indicate corresponding or similar parts throughout the several figures of the drawings:

FIG. 1 is a semi-diagrammatic view showing the components of an analytical system most advantageously utilizing the flow-through cell according to the invention.

FIG. 2 is a reduced perspective view of an assembly of flow-through cells each constructed according to the invention, and most advantageously used in the system of FIG. 1.

FIG. 3 is a section taken through lines 3—3 of an assembled flow-through cell of FIG. 2.

FIG. 4 is an enlarged section taken through lines 4—4 of FIG. 3.

FIG. 5 is a diagrammatic exploded plan view of the flow-through cell of the type shown in FIG. 3, illustrating the manner of assembly thereof.

FIG. 6 is an enlarged elevation view of a modified form of flow-through cell especially adapted for short light path.

FIG. 7 is a diagram showing comparative clearance characteristics of the flow-through cell embodying the invention relative the characteristics typical of the prior constructions.

FIG. 8 is a diagrammatic illustration of a typical absorbency recording obtained using a flow-through cell of the invention and a similar recording where a conventional flow cell was used.

As illustrated in FIG. 1, the apparatus most preferably forming the environment in which the flow-through cell of the invention may be most advantageously used is shown in a semi-diagrammatic form. A sample mixture to be studied and analyzed is added to a solvent in carefully measured proportions to form a solution of known concentration. The solution is then poured or otherwise transferred to an elongate, vertically arranged tubular member 20 generally of glass material, which has been filled with finely divided absorbent medium 22 such as, for example, polysulfonated sytrene resin. The tube member 20 is tapered at its lower end and connected thereat by a flexible conduit 24 to an inlet of the flow-through cell of the invention generally designated by reference character 30. The solution passes through the chromatographic column 20 in a well known manner whereby various components thereof travel at different rates due to the selective rate of absorption of each component by the absorbent medium 22. Therefore, each component is selectively separated and successively discharged at the lower end of the column 20, each separated fraction passing through conduit means 24 into the flow-through cell and thence therethrough, outward from the outlet of said cell to a collection station 26, which may comprise well known fraction collector means.

The flow-through cell 30 generally is disposed to intercept and pass through the examining chamber thereof, a suitably columnated fine pencil beam of light as indicated at 28. The source of light may comprise a device 32 which is capable of producing light beams of different length, and may be of any conventional construction having sufficient quality to provide, preferably, a good monochromatic light of suitable beam dimension and further providing adequate control for spectral analysis.

The flow-through cell 30 may be used singly or may be assembled in an assembly to be described hereinafter. Means 34 are provided for positioning the flow-through cell 30 whereby the beam of light 28 passes through the examining chamber thereof to emerge from the cell 30 and pass to a photosensitive device 36, to produce a signal which is amplified by passing through a suitable amplifier 38 to a recorder 40.

The amplifier 38 preferably is of a construction which will provide an output that is directly proportional to the absorbency of the substance being observed. The recorder 40 preferably is of the self-balancing type with a scale arranged in which the amplifier 38 is normally operated.

The construction, function and relationship of the general components of the optical recording chromotographic analytical system, with the exception of the flow-through cell of the herein invention, may be in accordance with the present state of the art. However, it should be understood that the flow-through cell of the invention when utilized with the said system so increases the adaptability of the basic system as to be of major importance.

Attention is briefly called to FIG. 2 and the assembly 50 of flow-through cells 30, each of which is constructed in accordance with the herein invention. The flow-through cells 30 are shown and are designated 30a, 30b, 30c and 30d respectively. The cells 30 are arranged upon an L-shaped carriage 52 having a base 54 and an upstanding leg 56, a portion thereof serving as one end wall of each of the flow-through cells 30. Three of the cells 30 are arranged left to right taken in the direction of the arrow 58, in order of decreasing light beam path length, cell 30a being of 10 millimeter path length, cell 30b being of 5 millimeter path length and cell 30c being of 2 millimeter path length. Cell 30d has a 10 millimeter path length and is disposed at the extreme right hand end of carriage 52. The cell 30d may serve as a blank or pure solvent monitoring cell and is useful in obtaining direct comparative measurements. The solvent may be fed, either by gravity and/or a suitable pump (not shown) through the cell 30d and may then be fed into the chromatographic column along with the sample solution. In this manner, the reference reading can be obtained continuously which reflects the state of light absorption of the pure solvent, thus compensating for any changes in absorbancy characteristic thereof over the time period. This measurement may be compared with the measurements made by exposure of the effluent containing cells to obtain an easily interpreted concentration measurement on each successive effluent fraction as it passes respectively through the cells 30a, 30b and 30c. Suitable conduit 59 permits passage of the excessive effluent fractions from the outlet of one cell to the inlet of the other and finally to the collector means 26 diagrammatically shown in FIG. 1.

Referring now to FIG. 3, the flow through cell 30 of the invention comprises a cell block 60 of substantially rectangular configuration. The cell block 60 may be formed of metal, such as stainless steel, or may be formed of glass. Cell block 60 has a transverse passage 62 formed therein, and a pair of window elements 64 and 66 closing off the opposite ends of said passage 62 and held in sealing engagement with the mouth of said passage 62 by means of wall members 68 and 70. Screw means 72 is provided to secure the various elements in assembly. The wall member 70 may be, as shown, the upstanding leg 56 in the aforementioned carriage member 52, and may be described as the front or source facing wall of the flow-through cell 30. Each of the walls 68 and 70 are provided with a passageway 74 placed coaxially with the transverse passage 62 of the cell block when the cell 30 is assembled. Each of said passageways 74 has a portion 76 of greater diameter communicating with the cell block facing side of the respective walls 68 and 70. The diameter of said portion 76 is chosen to receive the windows 64 and 66 respectively therein in tight sealing engagement. Each of the windows 64 and 66 is cushioned at one end 78 of portion 76 by an O-ring 80, preferably of resilient rubber material. In installed condition, the outer surfaces of the windows 64 and 66 are flush with the cell block facing surfaces of wall members 68 and 70. A gasket 81 preferably of plastic or similar material is interposed between the walls 68 and 70, having the windows 64 and 66 inserted in portion 76 therein, and the cell block 60 over each of the mouths of the transverse passage 62 to form a sealing engagement therebetween.

Inlet means 82 and outlet means 84 are provided in the cell block 60 by conduits 86 and 88 respectively disposed normal to the transverse passageway 62 of the cell block 30 and in communication therewith at a location closely adjacent the opposite ends thereof. The outlet means 84 is disposed closely adjacent that end of the transverse passageway near the source wall 70 of the assembled cell 30.

Interior of the transverse passageway, shown generally at 62, is disposed an insert 90 of tubular configuration preferably formed of stainless steel material. The length of said insert member 90 is chosen to be slightly less than the length of the transverse passageway 62 so that one end of the insert may be flush with the mouth of said passageway 62 while the opposite end of the insert 92 is inwardly displaced from the mouth at the opposite end of the passageway 62. The diameter of the insert member is preferably chosen to be less than the iner diameter of the transverse passageway 62, and the said insert member 90 is provided with an annular flange 92 between opposite ends thereof, the diameter of said flange 92 being chosen to be substantially equal to the inner diameter of the transverse passageway 62, whereby said insert 90 is adapted to be forcibly telescopically inserted within the passageway 62 to assume the position shown in FIG. 3.

The insert member 90 is provided with an axial bore 94 preferably of elliptical cross-section, which bore 94 constitutes the examining or sample holding chamber of the flow-through cell of the invention. Each opposite end of said insert member 90 has a flat surface 98 and 98' respectively, and surface 98 and 98' are substantially parallel one to the other, and disposed at diametrically opposed locations on the respective opposite ends of said insert member 90. Each end has the remaining surface 99 and 99' thereof canted inwardly of the flat surfaces 98 and 98' respectively; each of said surfaces 99 and 99' being substantially parallel one to the other. The tapering of said canted surfaces 99 and 99' may be accomplished by milling the ends of said insert 90 in a conventional manner.

When the flow-through cell 30 has been assembled in the manner shown in FIG. 5 to the assembly shown in FIGS. 2 and 4, the flat surface 98 of the insert member 90 is held in flush sealing relationship with the window 64. Therefore an annulus 100 is defined by the outer circumferential wall of the said insert 90, the inner circumferential wall of the transverse passage 62 and the annular flange 92 of the insert 90. The inlet means 82 communicates with this annulus 100. What is referred to herein as the diffuser chamber 102 is defined between the tapered surface 99 of the insert 90 and the window 64. The annulus communicates with this diffuser chamber 102 which in turn communicates with the examining chamber 94.

At the opposite end of the transverse passageway 62, flat end wall 98' of the insert 90 is spaced from the window 66, but a second annulus 104 is nevertheless defined by the outer circumferential surface of said insert 90, the inner surface of the transverse passageway 62 and the other side of flange 92. Similarly, the tapered surface 99' and the window 66 define a second chamber which shall be referred to as an exhaust chamber 106. The exhaust chamber 106 communicates directly with outlet means 84 of the cell block 60 and the second annulus 104 also communicates with both said exhaust chamber 106 and said outlet means 84.

A better understanding of the operation of the flow-through cell of the invention may be had by describing the path taken by an effluent fraction discharged from the chromatographic column 20 and passed through the flow cell 30. The effluent fraction will pass the tapered tip of the column 20 through conduit means 24 to enter the cell 30 by inlet means 82. The fraction will then pass into the first annulus 100. Flow will be directed in an annular path downward along the annulus 100. The fraction then will enter the diffusion chamber 102 adjacent bottom of the annulus 100. Thus flow will be then directed from the chamber 102 upward across the face of window 64 and into the interior of the examining chamber 94. The increased momentum given the peripheral areas of the flowing body by virtue of its passage through the annulus 100 will not be impeded by the diffusion chamber 102 as there is an absence of sharp corners. The absence of such a sharply defined interface between the window 64 and the examining chamber 94 also prevents the accumulation of pockets of entrapped or semi-stagnant effluent fractions, bubbles or other possible debris or turbulence.

The flow continues with the added velocity imparted to those areas of the flowing fluid body adjacent the cell walls through the examining bore 94. The increased peripheral velocity neutralizes the retardative effect of the walls of the cell and in this manner, the rate of flow may be held substantially uniform. Also, the walls, both upper and lower of the examining chamber, are washed free of any lingering portions of effluent and no pockets thereof are allowed to accumulate within the bore 94. The fraction will move from the outlet end of the bore into the exhaust chamber 106, thence to the outlet means 84. It can be seen that since the passing fraction is being simultaneously washed from the walls of the examining chamber 94 as it passes therethrough, the next succeeding fraction will not encounter any residual history of its immediately preceding body of fluid.

In the assembly shown in FIG. 2, the fluid fractions pass in the same order as they are discharged from the column through one flow-through cell to another of differing light beam path. In this way, all the resultant light absorbancy measurements may be recorded on the same chart.

Referring now to the flow-through cell 30c, whose cell block 160 is shown in FIG. 6, attention is called to the modified embodiment of the invention constituted thereby. Since the flow-through cell 30c is selected to have a light beam path that is very short compared with the other light beam paths represented by the cells 30a and 30b, the end faces of the insert member 190 has been modified. Insert member 190 thus comprises a disc member 192 of uniform diameter and of a thickness equal to the length of the light path desired, in this instance, 2 millimeters. Insert 190, with an elliptical cross-section bore 191 provided therein, is further provided with a pair of offset groove portions 194 and 196 respectively, one on each end face of the disc 192. The grooves 194 and 196 are at an angle relative one to the other in opposite directions from a line normal to the axis of the bore 191. Insert 190 is adapted to be forcibly inserted within the transverse passage 162 of the cell block 160 whereby said insert is flush on both faces thereof with the side walls of the cell block 160. The grooves 194 and 196 define, with their adjacent flushly sealingly mounted window (not shown), an inlet chamber 202 and an exhaust chamber 206, each communicating respectively at one end with the inlet and outlet means 182 and 184 and at their other inner ends with the examining chamber or bore 191. The comparatively shortness of flow path makes it possible to eliminate the annulus 100 and 104 shown as cells 30a and 30b and still impart increased peripheral momentum to the fluid fraction passing therethrough, thereby neutralizing the normal retarding effect upon said peripheral flow velocity attributed to the cell wall and thereby achieving an even flow pattern and permitting the washout of fractions substantially simultaneously with the passage thereof through the cell 30. In both examples, it is to be understood that insert 90 and 190 must be both fluid and pressure tight to effect distinct separation of the inlets and outlets of their respective cells.

Referring now to FIGS. 7 and 8, there is shown a graphic representation illustrating the benefits obtained through the use of the flow cell of the herein invention.

In FIG. 7, there is shown percent absorbancy plotted against time. Curves 1, 2, 3 and 4 are actually determined by recording any absorbancy of a $2 \times 10^{-4}M$ potassium chromate solution as the same was displaced by distilled water using a 5 millimeter path length flow-through cell made in accordance with the invention and at different flow rates, namely: (1) 90 millimeters per hour; (2) 48 millimeters per hour; (3) 24 millimeters per hour; and (4) 12 millimeters per hour. Additional curve (5) is shown as a diagrammatic representation of a typical clearance measurement using a conventional flow cell. While at very low rates of flow, the clearance curves are infinitely asymptotic to a line approaching zero absorbancy, the curve representing a typical recording taken with a conventional flow cell illustrates that the asymptotic line is one closer to 35 to 40 percent absorbancy and a slope of the curve is more diagonal than vertical. The washout characteristics obtained by means of the flow-through cell of the invention are of a degree not heretofore possible using conventional flow cells.

Referring now to FIG. 8 which is an illustrative diagram of a typical recording obtained when using a flow-through cell of the invention as compared with a recording of a similar nature utilizing a conventional cell. In these curves, absorbancy units are plotted relative time. Curve A represents a recording using a cell embodying the invention and Curve B is a similar curve where a flow-through cell of conventional configuration is utilized. One immediately notes that the primary difference between the curves is the differentiation of the peaks thereof matching each constituent component of the sample. The peaks and valleys are clearly defined in Curve A but in Curve B there is evidence of inadequate separation of components as illustrated by the absence of deep valleys between peaks. The illustration herein is exemplary; actual recording diagrams which substantiate the above results described have been obtained.

It is contemplated that the annulus 100 and/or annulus 104 may be formed by counterboring the passageway 62 and inserting a member of cylindrical configuration in lieu of insert member 90 and/or member 190 respectively.

It is also seen by the reference to FIG. 5 without the need for additional description, that the flow-through cell embodying the invention is easily disassembled and reassembled for cleaning and/or replacement of parts.

In the claims:

1. In apparatus for use in optical monitoring of flowing fluid fractions, a flow-through cell comprising a cell block having an open-ended lateral passageway and sealing means, including transparent windows, disposed over said ends, conduits defining inlet and outlet ports communicating with said passageway adjacent respective opposite ends of said passageway, an insert member tightly engaged entirely within said passageway, said insert member having opposite end surfaces and a precise axial bore of known predetermined volume and opening to said end surfaces, said insert having at least a portion of one end surface thereof flush with the window adjacent thereto at the inlet end of the passageway, and the opposite end surfaces at each end of the insert defining a channel between its adjacent window and the respective end surface communicating respectively between the inlet and outlet ports and the axial bore to direct the fluid in a sweep across the window in its passage therepast and simultaneously imparting to said flowing fluid, an increased momentum along select portions thereof during passage of said fluid fractions through the axial bore compensating for normal lag of said select portions whereby to maintain the flowing fluid in discrete fractions during passage through the cell.

2. The apparatus as claimed in claim 1 in which each of said end surfaces has portions thereof canted inwardly of the window to define said channel.

3. The apparatus as claimed in claim 1 in which each of said end surfaces has portions thereof canted inwardly of the window to define said channel and said insert having reduced diameter portions immediately adjacent said windows to define an annulus communicating with said channel and opening thereto at a location circumferentially spaced from said inlet port whereby to establish the sole communication between the inlet port and the channel.

4. The apparatus as claimed in claim 1 in which said axial bore is of elliptical cross-section.

5. In apparatus for use in optical monitoring of flowing fluid fractions, a flow-through cell comprising a cell block having an open-ended precise axial bore of known predetermined volume and sealing means, including transparent windows, disposed over the ends of said bore, conduits defining inlet and outlet ports communicating to the interior of said cell block adjacent respective opposite ends of said bore, an internal portion within said cell block and located between the ends of said bore, said internal portion having opposite end surfaces, said internal portion having at least a portion of one end surface thereof flush with the window adjacent thereto at the inlet port, and the opposite end surfaces at each end of said internal portion defining a channel between its adjacent window and the respective end surface communicating respectively between the inlet and outlet ports and the axial bore to direct the fluid in a sweep across the window in its passage therepast and simultaneously imparting to said flowing fluid, an increased momentum along select portions thereof during passage of said fluid fractions through the axial bore compensating for normal lag of said select portions whereby to maintain the flowing fluid in discrete fractions during passage through the cell.

References Cited by the Examiner

UNITED STATES PATENTS

| | | | |
|---|---|---|---|
| 1,471,342 | 10/1923 | Logan | 88—14 |
| 2,547,212 | 4/1951 | Jamison et al. | 88—14 |
| 2,642,536 | 6/1953 | Heigl | 250—218 |
| 2,761,067 | 8/1956 | Troy | 88—14 |
| 2,806,148 | 9/1957 | Barton | 250—218 |
| 3,026,764 | 3/1962 | Allen | 88—14 |
| 3,080,789 | 3/1963 | Rosin et al. | 250—218 |

JEWELL H. PEDERSEN, *Primary Examiner.*

FREDERICK M. STRADER, *Examiner.*

O. B. CHEW, *Assistant Examiner.*